United States Patent
Ciudad et al.

(10) Patent No.: US 11,475,106 B2
(45) Date of Patent: Oct. 18, 2022

(54) APPLICATION USAGE POLICY ENFORCEMENT

(71) Applicant: Apple Inc., Cupertino, CA (US)

(72) Inventors: Jean-Pierre Ciudad, San Francisco, CA (US); Augustin J. Farrugia, Los Altos Hills, CA (US); David M'Raihi, San Carlos, CA (US); Bertrand Mollinier Toublet, Santa Clara, CA (US); Gianpaolo Fasoli, Redwood City, CA (US); Nicholas T. Sullivan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 790 days.

(21) Appl. No.: 16/177,250

(22) Filed: Oct. 31, 2018

(65) Prior Publication Data

US 2019/0114399 A1    Apr. 18, 2019

Related U.S. Application Data

(63) Continuation of application No. 12/907,915, filed on Oct. 19, 2010, now abandoned.

(51) Int. Cl.
*G06F 21/10* (2013.01)
*G06Q 30/06* (2012.01)

(52) U.S. Cl.
CPC ....... *G06F 21/105* (2013.01); *G06Q 30/0601* (2013.01); *G06Q 30/0641* (2013.01)

(58) Field of Classification Search
CPC ...... G06Q 20/00–425; G06Q 30/00–08; G06F 21/00–88
See application file for complete search history.

(56) References Cited

U.S. PATENT DOCUMENTS

| 5,708,709 A | 1/1998 | Rose |
| 5,790,664 A | 8/1998 | Coley et al. |

(Continued)

FOREIGN PATENT DOCUMENTS

| CN | 1539107 A | 10/2004 |
| CN | 1853408 A | 10/2006 |

(Continued)

OTHER PUBLICATIONS

Brazalian Patent Application No. BR112013009278-5—Office Action dated Oct. 1, 2019.

(Continued)

*Primary Examiner* — Mohammad A. Nilforoush
(74) *Attorney, Agent, or Firm* — Dickinson Wright RLLP

(57) ABSTRACT

Disclosed herein are systems, methods, and non-transitory computer-readable media for enforcing application usage policies. As part of an application purchase transaction, the application distributor creates a unique proof of purchase receipt. This receipt can be bundled with the application and delivered to the purchaser. Each machine can maintain an authorization file that lists the users authorized to use applications on that machine. A system configured to practice the method verifies that a user is authorized to use an application on a machine based on an application proof of purchase receipt and the authorization file. If the application proof of purchase receipt and the authorization file are both valid, the system checks if the user account identifier in the receipt is contained in the authorization file. If so, the user can be considered authorized to use the application on the machine.

18 Claims, 13 Drawing Sheets

(56) References Cited

U.S. PATENT DOCUMENTS

| | | | | |
|---|---|---|---|---|
| 5,907,617 | A | * | 5/1999 | Ronning ............... G07F 17/16 705/52 |
| 6,189,146 | B1 | * | 2/2001 | Misra ............... G06F 21/105 705/59 |
| 6,920,567 | B1 | | 7/2005 | Doherty et al. |
| 7,549,047 | B2 | | 6/2009 | Balfanz et al. |
| 8,160,967 | B2 | | 4/2012 | Winzenried et al. |
| 2002/0013772 | A1 | | 1/2002 | Peinado |
| 2002/0184161 | A1 | | 12/2002 | Chang |
| 2003/0014635 | A1 | | 1/2003 | Laforge et al. |
| 2003/0084306 | A1 | | 5/2003 | Abburi et al. |
| 2004/0088541 | A1 | | 5/2004 | Messerges et al. |
| 2004/0117619 | A1 | | 6/2004 | Singer et al. |
| 2005/0022025 | A1 | | 1/2005 | Hug |
| 2006/0106727 | A1 | | 5/2006 | Yellai et al. |
| 2006/0131397 | A1 | | 6/2006 | Reddy et al. |
| 2006/0272031 | A1 | | 11/2006 | Ache et al. |
| 2006/0282391 | A1 | | 12/2006 | Peterka et al. |
| 2006/0287959 | A1 | | 12/2006 | Blecken |
| 2007/0033651 | A1 | | 2/2007 | Imanishi |
| 2008/0027742 | A1 | | 1/2008 | Maeda |
| 2008/0134312 | A1 | | 6/2008 | Ache et al. |
| 2008/0319779 | A1 | | 12/2008 | Hughes et al. |
| 2009/0133128 | A1 | | 5/2009 | Uchikawa |
| 2010/0138903 | A1 | | 6/2010 | Medvinsky |
| 2010/0153873 | A1 | | 6/2010 | Gutirrez |
| 2012/0095877 | A1 | | 4/2012 | Ciudad et al. |

FOREIGN PATENT DOCUMENTS

| | | |
|---|---|---|
| CN | 1906558 A | 1/2007 |
| CN | 101114329 A | 1/2008 |
| CN | 101339592 A | 1/2009 |
| CN | 101755271 A | 6/2010 |
| CN | 101866404 A | 10/2010 |
| JP | 08044633 A | 2/1996 |
| JP | 2002268764 A | 9/2002 |
| JP | 2003101526 A | 4/2003 |
| JP | 2003513388 A | 4/2003 |
| JP | 2004326552 A | 11/2004 |
| JP | 2008542877 A | 11/2008 |
| JP | 2009123100 A | 6/2009 |
| WO | 9842098 A1 | 9/1998 |
| WO | 0057684 A2 | 10/2000 |
| WO | 0058811 A2 | 10/2000 |
| WO | 0133317 A1 | 5/2001 |
| WO | 02101577 A1 | 12/2002 |
| WO | 2009014367 A2 | 1/2009 |

OTHER PUBLICATIONS

Japanese Patent Application No. 2013-534945—Office Action dated May 19, 2014.
International Application No. PCT/US2011/055653—Preliminary Report on Patentability dated May 2, 2013.
International Application No. PCT/US2011/055653—International Search Report and Written Opinion dated Jul. 25, 2012.
Korean Patent Application No. 10-2013-7012753—Office Action dated May 19, 2014.
European Patent Application No. 11776044.7—Office Action dated Jul. 12, 2016.
Chinese Patent Application No. 201180050396.5—Office Action dated Feb. 2, 2015.
Australian Patent Application No. 2011318417—Examination Report No. 1 dated Sep. 10, 2014.
Ron White, How Computers Work, Oct. 15, 2003, Que Publishing, 7th Ed, p. 4. (Year: 2003), 23 pages.
Indian Patent Application No. 1031/KOLNP/2013—First Examination Report (FER) dated Dec. 1, 2018.

* cited by examiner

APPLICATION USAGE POLICY ENFORCEMENT

CROSS-REFERENCE TO RELATED APPLICATIONS

The present application is a continuation of U.S. application Ser. No. 12/907,915, filed Oct. 19, 2010, entitled "APPLICATION USAGE POLICY ENFORCEMENT," which is incorporated herein by reference in its entirety for all purposes.

FIELD

The present disclosure relates to enforcing application usage policies and more specifically to preventing unauthorized execution of an application on a computer.

BACKGROUND

An important feature of computer software is that a single piece of software can be installed on multiple machines without a need to alter the software. This is advantageous for the software developer because they can develop the software once and then distribute it to many different users without any additional work. It is also advantageous for the user because he or she can move their software from one machine to another, for example, when the user buys a new computer. Software portability also makes it possible for a user to buy a single copy of the software and simultaneously install it on multiple computers, which in some situations may be undesirable. For example, some software may be very costly to produce and have a very small target market. In this case, unauthorized copying may prevent the developer from recouping their costs.

To prevent unauthorized copying, software developers often employ an installation process that requires a unique product key for each installation of the software. This approach prevents unauthorized copying, but it also makes it difficult for a user to migrate from one machine to another. Furthermore, this solution is cumbersome when a software developer has a policy that allows a user to install the software on a specified number of machines.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and non-transitory computer-readable storage media for enforcing application usage policies.

In an application server embodiment, a system configured to practice the method is configured to receive a purchase request. In response to the request, the system can create a proof of purchase receipt for that purchase. The receipt can include various pieces of information about the purchase transaction, such as the user's account identifier, the application identifier, the application version number, the purchase date, and parental control ratings for the application. The system can sign the receipt, bundle it with the application, and send the application bundle to the requesting client device.

In a client device embodiment, when a user wants to use an application on a machine, the system can verify that the usage adheres to the usage policies. When a user purchases an application, an application proof of purchase receipt is included with the application. To run the purchased application on a particular client device, the account identifier associated with the purchased application must be authorized on the client device. Each client device can maintain an authorization file that can specify a client identifier for that client machine and all of the user identifiers authorized to use applications on that client device. When a user attempts to use an application, the system can verify that the proof of purchase receipt and the authorization file are valid. Additionally, the system can verify that the user specified in the proof of purchase receipt is in the authorization file. In some embodiments, if the user is not in the authorization file, the system can make a request to authorize the user.

As an example enforcement mechanism, the system can include a de-authorization counter to try to prevent a user from circumventing the application usage policy. A de-authorization count field can be included in the application proof of purchase receipt and the authorization file. A de-authorization count can also be maintained by the system. When a user makes a request to purchase an application, the system can construct a proof of purchase receipt for that purchase which includes the current de-authorization count for the user. When a user attempts to use an application, the system can verify that proof of purchase receipt and the authorization file are valid. Additionally, the system can verify that the user specified in the proof of purchase receipt is in the authorization file. Finally, the system can verify that the de-authorization count in the receipt is less than or equal to the de-authorization count in the authorization file. This enforcement mechanism can provide a simple way for a user to transfer the application a set number of times, according to the terms of the application usage policy.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure addresses the need in the art for improved methods of selecting targeted content presented to a user based on characteristics descriptive of the user and/or the user's interaction with one or more items of targeted content.

Figure 1:
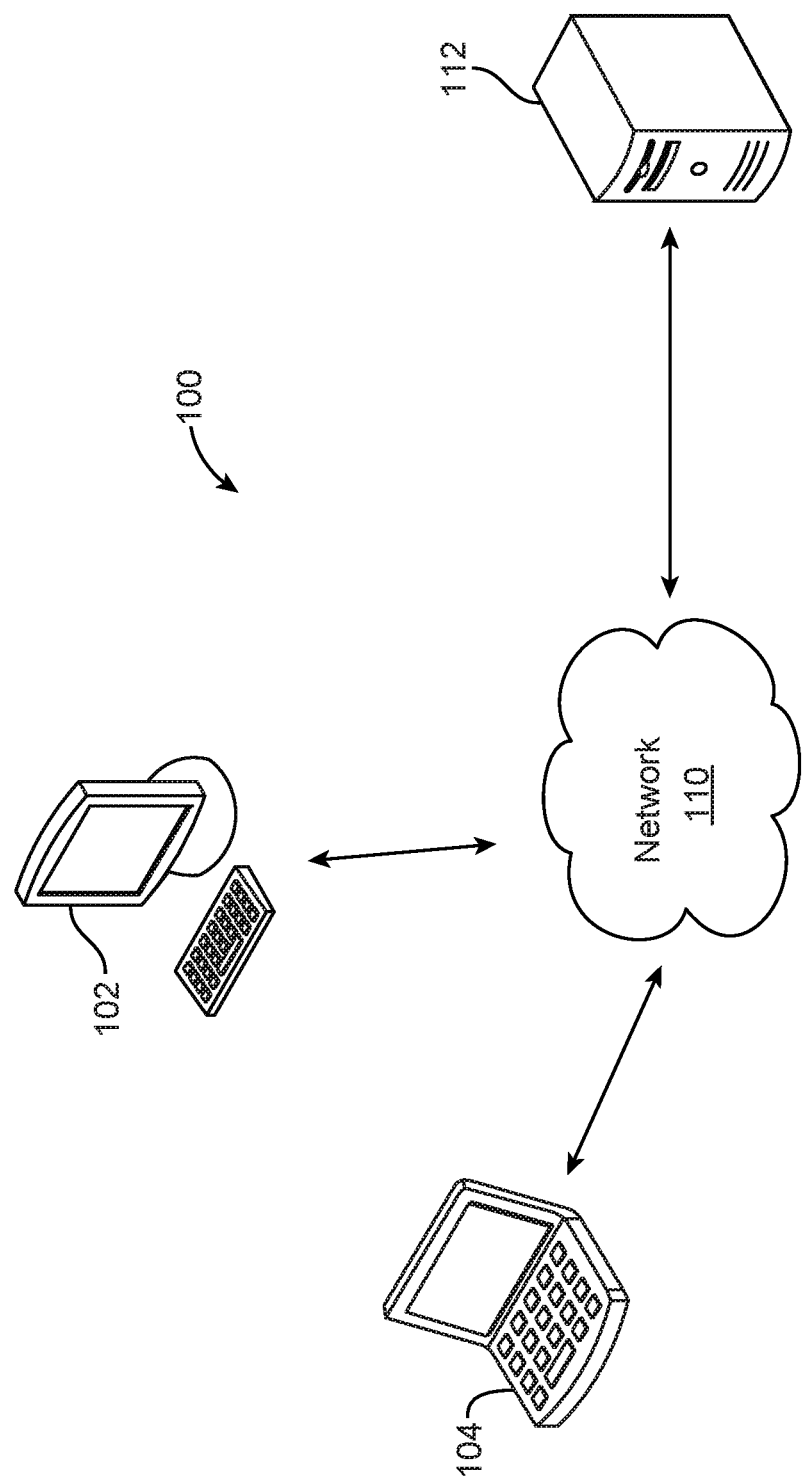
FIG. 1 illustrates an exemplary system configuration for application distribution and usage.

The presently disclosed system and method is particularly useful for enforcing application usage policies on a computer. An exemplary system configuration 100 for application distribution and usage is illustrated in FIG. 1, wherein electronic devices 102, 104 communicate via a network 110 with an electronic application distributor 112. The system can be configured for use on a wide area network, such as that illustrated in FIG. 1. However, the present principles are applicable in a wide variety of network configurations that facilitate the intercommunication of electronic devices. For example, each of the components of system 100 in FIG. 1 can be implemented in a localized or distributed fashion in a network.

In system 100, the user terminals 102 and 104 interact with the application distributor 112, via direct and/or indirect communication, to obtain computer programs, also known as applications. Any number or type of user terminals can interact with the application distributor 112. For example, a user terminal 102 can be a desktop computer; a laptop computer; a handheld communication device, e.g., mobile phone, smart phone, tablet, or any other type of device connecting using multiple or non-persistent network sessions; etc. The user terminal 102 makes a request, such as a purchase request, to the application distributor 112. The application distributor 112 responds by either delivering the requested content to the requesting user terminal 102 or denying the request. A request can be denied, for example, due to a failure on the part of the user terminal 102 to supply an adequate method of payment.

Figure 2:
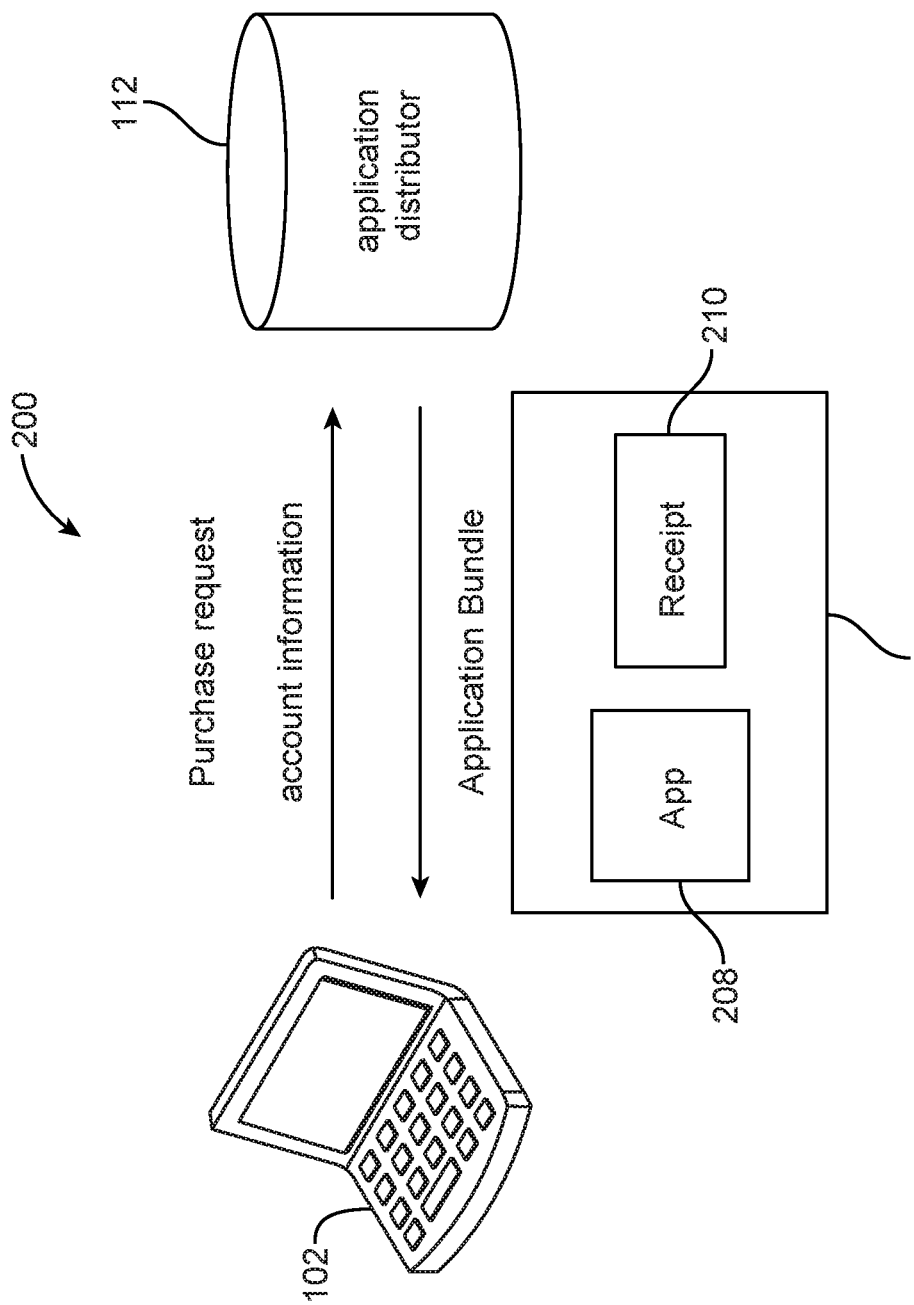
FIG. 2 illustrates an exemplary application purchase.

To facilitate enforcement of application usage policies, the application distributor can provide the requesting user terminal an application proof of purchase receipt along with the purchased application. FIG. 2 illustrates an exemplary application purchase 200. In the exemplary application purchase 200, the user terminal 102 makes a purchase request to the application distributor 112. As part of the purchase request, the user terminal 102 can provide account information for the requesting user. In some configurations, the account information can be a username and password. In other configurations, the account authorization can occur as a separate interaction with the application distributor 112 and thus, the account information can be a unique account identifier, such as a DSid. After receiving the purchase request, the application distributor 112 can create an application bundle 206 composed of the application 208 and the application proof of purchase receipt 210. The application distributor 112 can then deliver the application bundle 206 to the user terminal 102. As will be discussed in more detail below, the application proof of purchase receipt can be used at a later time to aid in enforcing a usage policy for the application.

A purchase transaction includes any kind of transaction for a recipient to obtain an application and does not necessarily require an exchange of money or other value. The purchase transaction can include a third party giving the application as a gift to the recipient, or the recipient can redeem a coupon, promotional code, or similar instrument in exchange for the application. In some cases, a purchase request can be made for a free application. Regardless of whether a monetary exchange is required to obtain the application, the application distributor can provide an application proof of purchase receipt with the application.

Figure 3:
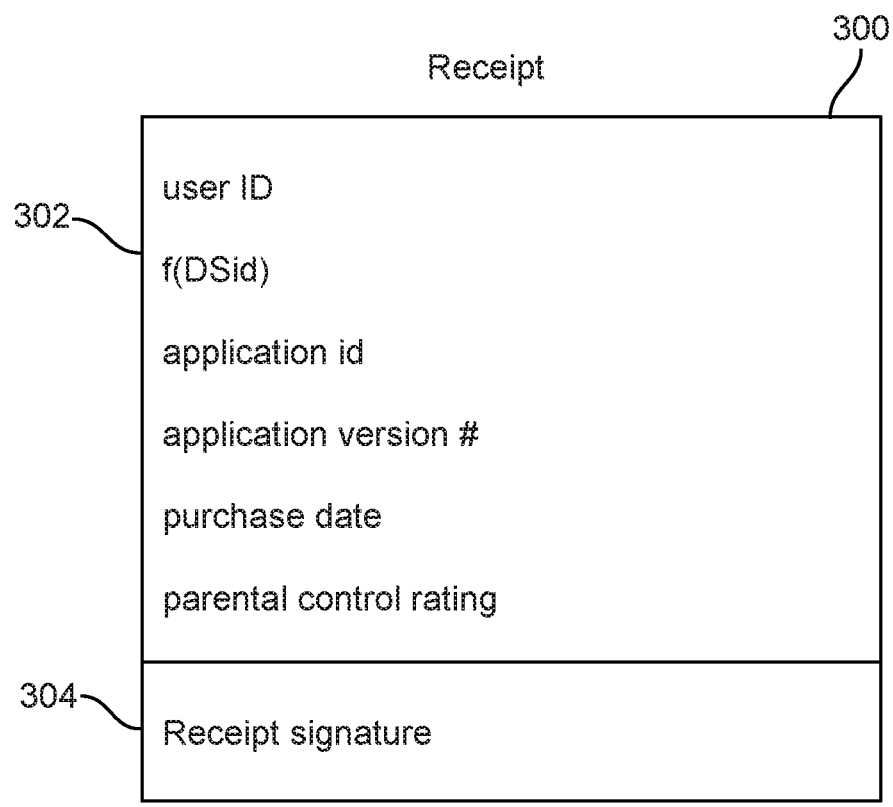
FIG. 3 illustrates an exemplary application purchase receipt.

An application proof of purchase receipt can include a variety of information, as illustrated in the exemplary proof of purchase receipt 300 in FIG. 3. The application proof of purchase receipt can include more or less information than is shown in FIG. 3. The proof of purchase receipt body 302 can include various account information associated with the user who purchased the application. The user can be an individual, a group of individuals, or an organization. The account information can include the user's ID, such as a username. The account information can also include a unique account identifier for the user, such as the DSid. In some configurations, instead of including the plaintext DSid, the proof of purchase receipt body 302 can include a unique representation of the DSid. For example, the unique representation can be a one-way representation of DSid, e.g., f(DSid). In some cases, the unique representation can be used to improve security of the receipt and/or user privacy. The proof of purchase receipt body 302 can also include various pieces of information about the purchased application. For example, the proof of purchase receipt body 302 can include the ID, the version number, and the parent control rating of the purchased application. In some cases, additional information about the application can be included in the receipt, such as an application signature. Additionally, the proof of purchase receipt body 302 can include the purchase date.

In some configurations, an application proof of purchase receipt body 302 can include additional and/or alternative information. Furthermore, the organization of the information within the proof of purchase receipt 300 can vary with the configuration of the system. In one variation, a server retains a full or partial copy of the application proof of purchase receipt 300.

In some configurations, the proof of purchase receipt 300 can be in plaintext, which would make it readable to any user that can understand the file layout. To prevent and/or detect unauthorized modification of the proof of purchase receipt 300, the proof of purchase receipt 300 can include a receipt signature 304. The receipt signature 304 can be any digital signature that can be used to detect unauthorized modification of the proof of purchase receipt. For example, the application distributor 112 can use a cryptographic hash function to generate a digital signature of the proof of purchase receipt body 302. In some configurations, the application distributor 112 can use a public key system to generate the digital signature. In this case, the application distributor 112 uses its private key to generate the receipt signature 304. A user terminal, the application distributor, and/or any other device with access to the application distributor's public key can then verify the receipt 300. Alternatively, the application distributor 112 can use a private key system to generate the receipt signature 304. In this case, unless the application distributor 112 shares its private key, only the application distributor can verify the receipt 300.

Figure 4:
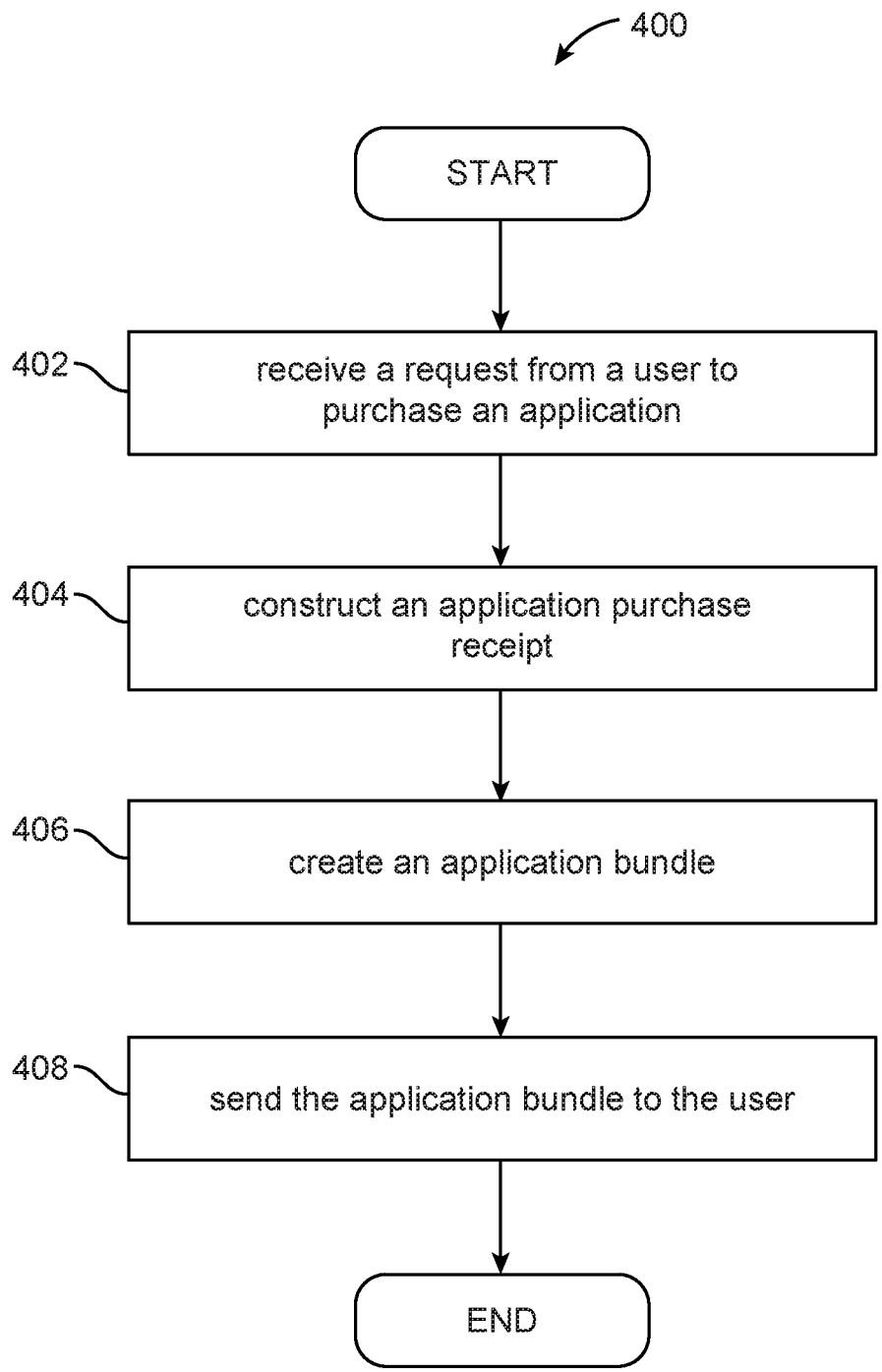
FIG. 4 illustrates an exemplary method embodiment for application purchase.

FIG. 4 is a flowchart illustrating steps in an exemplary method 400 for an application purchase that includes a proof of purchase receipt. For the sake of clarity, this method is discussed in terms of an exemplary system such as is shown in FIG. 1. Although specific steps are shown in FIG. 4, in other embodiments, a method can have more or less steps than shown. The method steps discussed in this and other figures can be implemented in the shown order or combination, or in any other order or combination.

At various points, the application distributor 112 receives a request from a user to purchase an application (402). The purchase request can come from any user terminal with access to the application distributor 112. As described above, the purchase request can include account information for the requesting user that can be used to facilitate the transaction, such as the user's account identifier.

In response to the purchase request, the application distributor 112 constructs an application proof of purchase receipt (404), such as the receipt 300 in FIG. 3. The application proof of purchase receipt can be unique to the transaction. For example, even if the user has previously purchased the application, the proof of purchase receipt associated with this purchase request will be different. However, in some configurations, the proof of purchase receipt can be unique to the user, application pair, instead of the transaction. After constructing the application proof of purchase receipt, the application distributor 112 creates an application bundle, based on the application purchase receipt and the application (406), and sends the application bundle to the requesting user (408).

After purchasing an application, it may be possible to use that application on multiple user terminals. To prevent a user from abusing this capability, an application developer and/or application distributor can institute a usage policy that limits the number of user terminals on which an application can be used at any one time. For example, suppose an application costs ten dollars. A user could purchase the application and then sell a copy of the application to nine of his friends for one dollar. Each of the ten users was then able to obtain a copy of the ten-dollar application for one dollar. In some cases, an application developer may be okay with this scenario; however, in other cases, such activity may prevent the developer from recouping their development costs. To curb such activity, a policy can be established to limit the number of copies to, say, five machines. One way of ensuring that a user only runs an application on a specified number of machines is to have the user authorize each machine on which he or she wants to use the application.

Figure 5:
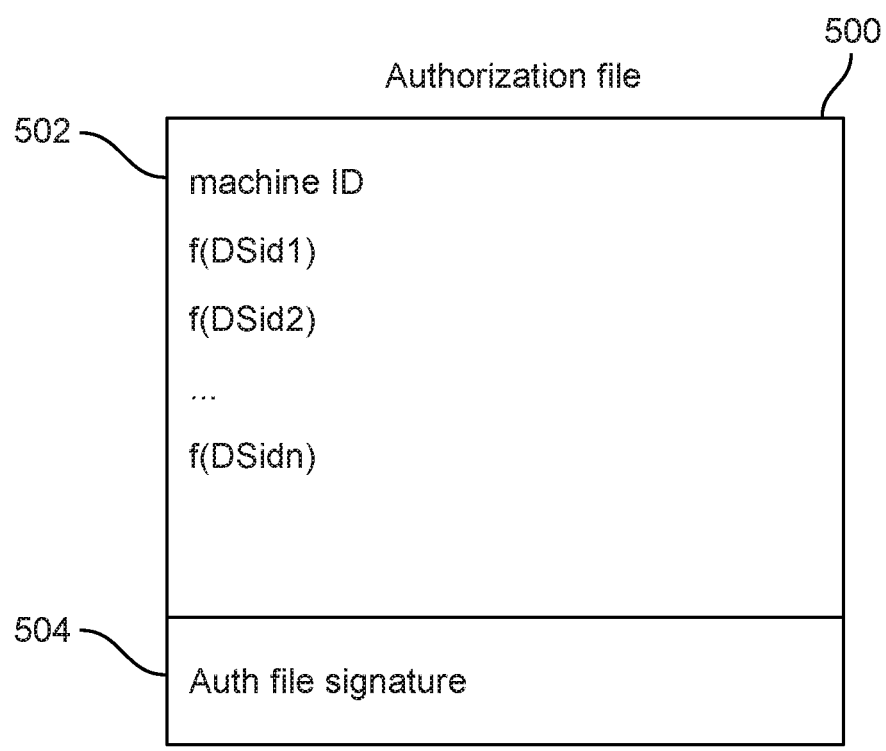
FIG. 5 illustrates an exemplary authorization file.

An authorization file, which can reside on the user's machine, can be used to facilitate user authorization. FIG. 5 illustrates an exemplary authorization file 500. The authorization file 500 can include an authorization file body 502. The authorization file body 502 can include a unique machine identifier for the machine associated with the authorization file 500. The unique machine identifier can be an identifier that can be linked to a user terminal. For example, the various hardware components in a computer can be associated with a unique identifier, such as a serial number. One or more of these serial numbers can be used to create a unique machine identifier.

The authorization file body 502 can also contain one or more unique account identifiers, e.g., DSid. The account identifiers contained in the authorization file 500 indicate the users who are authorized to use purchased applications on the machine. In some configurations, instead of including the plaintext DSid, the authorization file body 502 can include a unique representation of the DSid. For example, the unique representation can be a one-way representation of DSid, e.g., f(DSid). In some cases, the unique representation can be used to improve security of the receipt and/or user privacy.

In some configurations, an authorization file body 502 can include additional and/or alternative information. Furthermore, the organization of the information within the authorization file 500 can vary with the configuration of the system.

In some configurations, the authorization file 500 can be in plaintext, which would make it readable to any user that can understand the file layout. To prevent and/or detect unauthorized modification of the authorization file 500, the authorization file 500 can include an authorization file signature 504. The authorization file signature 504 can be any digital signature that can be used to detect unauthorized modification of the authorization file. For example, the application distributor 112 can use a cryptographic hash function to generate a digital signature of the authorization file body 502. In some configurations, the application distributor 112 can use a public key system to generate the digital signature. In this case, the application distributor 112 uses its private key to generate the authorization file signature 504. A user terminal, the application distributor, and/or any other device with access to the application distributor's public key can then verify the authorization file 500. Alternatively, the application distributor 112 can use a private key system to generate the authorization file signature 504. In this case, unless the application distributor 112 shares its private key, only the application distributor can verify the authorization file 500.

An authorization request can be made to the application distributor or any other device responsible for authorizing the users in the system. The authorization file can be used to keep track of which users are authorized to run applications on a particular user terminal, while the server can maintain authorization records to keep track of how many machines and/or the exact machines that each user is authorized on. The authorization records on the server can be used to make sure a user is not authorized on more machines than allowed by the usage policy.

Figure 6:
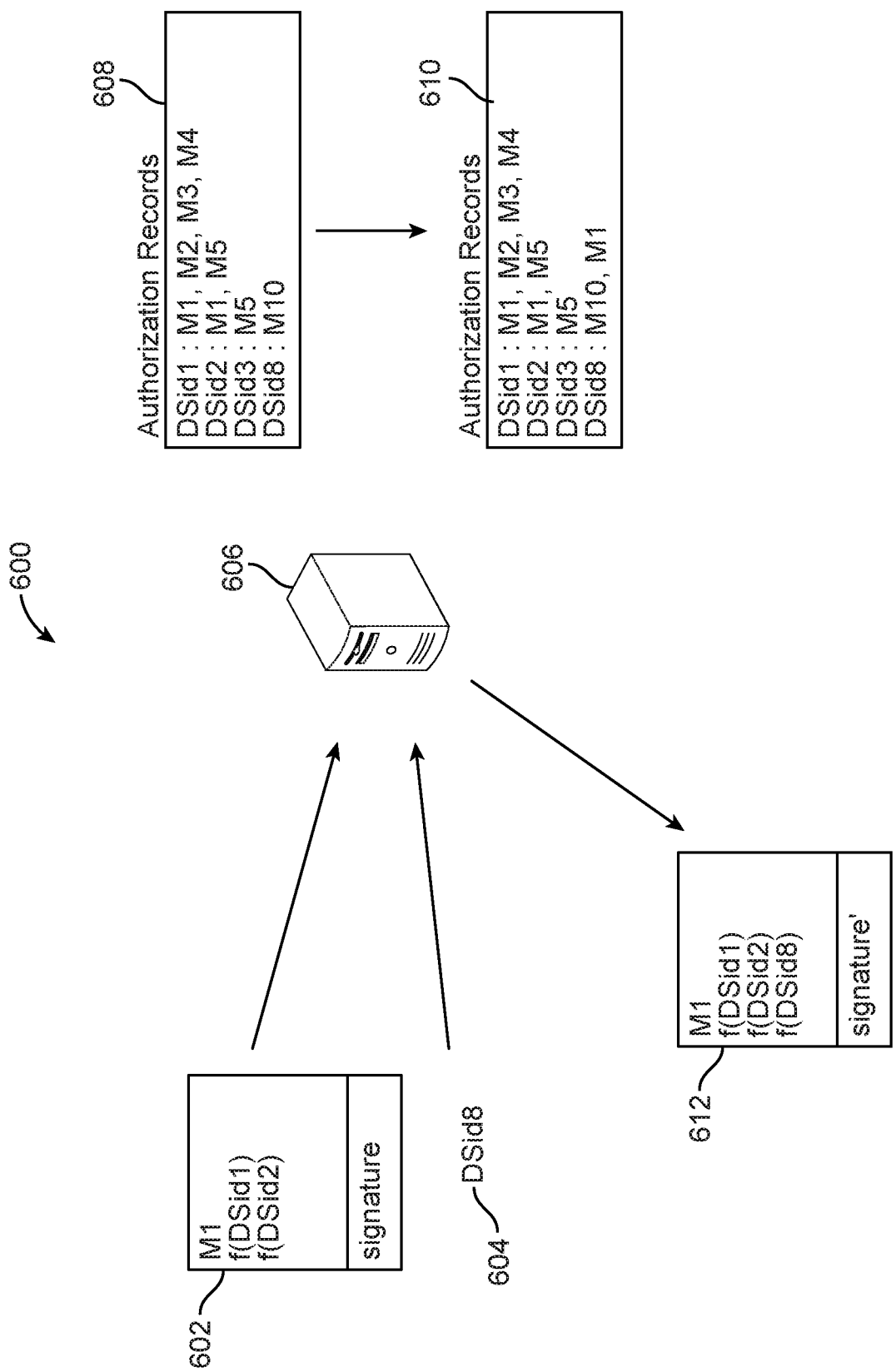
FIG. 6 illustrates an exemplary authorization request.

FIG. 6 illustrates an exemplary user authorization scenario 600. To authorize a user on a machine, the server 606 receives the authorization file 602 and the user's unique account identifier 604. The server 606 then checks the authorization records 608 to verify that the user is not already authorized on the maximum number of machines allowed under the usage policy. In this example, the user DSid8 is only authorized on one machine, which is less than the limit, so the server 606 can authorize the user. To authorize the user, the server 606 updates the entry in the authorization records for the user to include the machine identifier in the authorization file 602, i.e., M1. This yields the authorization records 610. The server also updates the authorization file by adding the user's account number, i.e., f(DSid8), and re-signing the file. The server 606 then returns the updated authorization file 612 to the user's machine. In some configurations, the server 606 can maintain other information in the authorization records. Other methods of authorization are also possible using all or part of these steps.

In some configurations, the usage policy can be static across all users and all applications, or the usage policy can be user-specific and/or application-specific. For example, a usage policy can be designed such that any user can be authorized to use any of the applications they purchased on up to five machines at any given time. However, the system can also be configured such that a usage policy can be specified for an individual application. For example, one application could allow users to use the application on 10 machines, while another application may only allow the user to use the application on 4 machines. To support a variable usage policy scheme the server 606 may need to store additional information in the authorization records.

Figure 7:
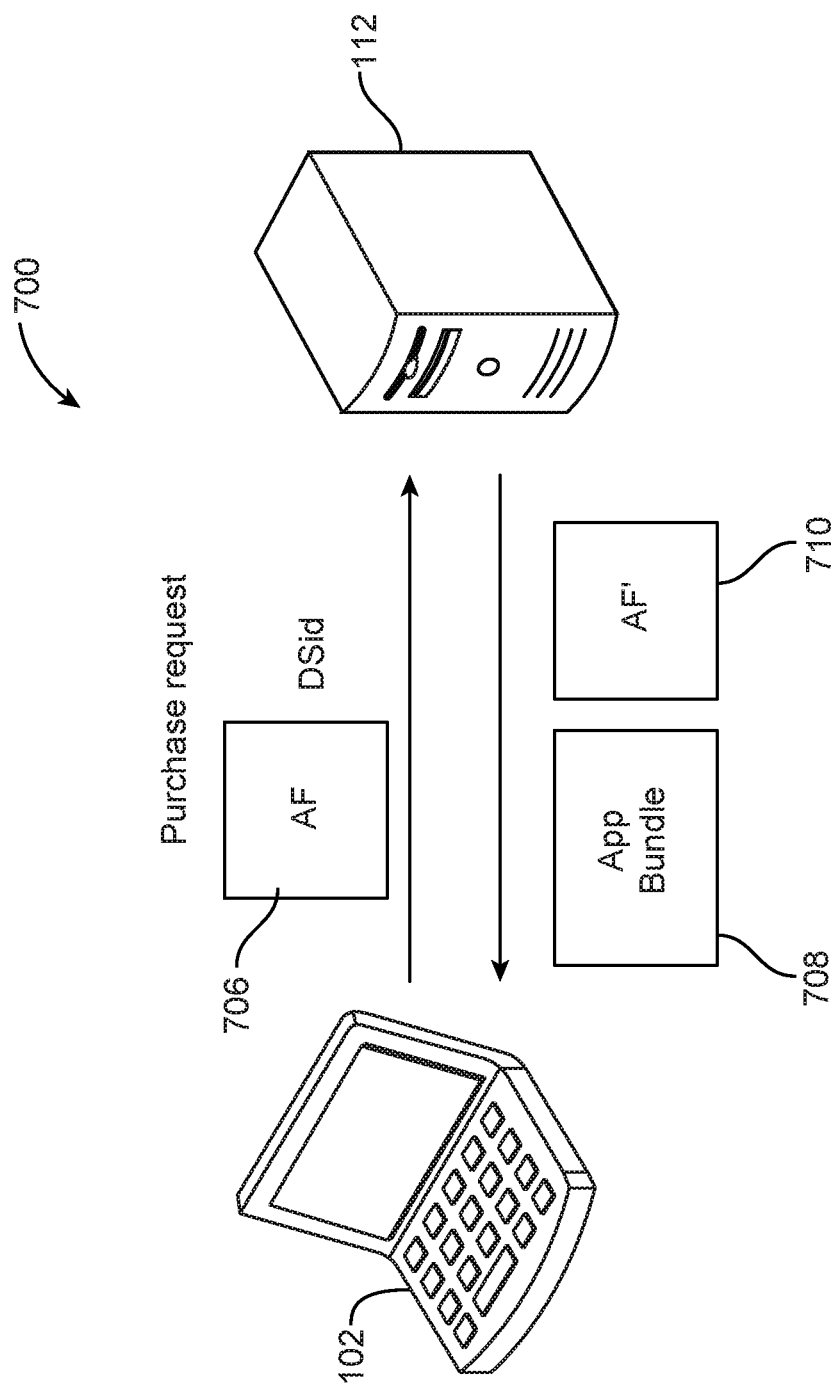
FIG. 7 illustrates an exemplary scenario for authorization on purchase.

In some configurations, user authorization can occur at the time the user purchases the application. FIG. 7 illustrates an exemplary scenario 700 for authorization on purchase. In method 700, the user terminal 102 makes a purchase request to the application distributor 112. In addition to account information, such as the DSid, the purchase request can include an authorization file 706 that resides on the user terminal 102. The application distributor 112 can create the application bundle 708 using the method 400 in FIG. 4 and can perform the authorization method 600 in FIG. 6 to update the authorization records and produce the authorization file 710. The application distributor 112 can then send the application bundle and updated authorization file 710 to the requesting user terminal 102. In some configurations, the application distributor 112 acts as an intermediary for the authorization request and simply passes the authorization request off to another device or server that will return the authorization file to the application distributor 112. In some cases, the user is authorized on the user terminal 102 prior to making the purchase request. In this case, the application distributor 112 can either return the authorization file unchanged or not return the file at all. In some configurations, the user terminal can determine that the user is authorized on the machine without making an authorization request to the server.

In some cases, authorization on purchase may be unnecessary because the user has no intention of using the application on the machine from which he or she purchased the application. For example, a user may have a slow Internet connection at home, but a very fast connection at work. In some cases, the Internet connection speeds may not matter, but for large applications a slow network connection can prevent a user from purchasing a particular application. To improve the user's purchasing experience, the user may decide to purchase the application at work and then transfer the application to the user's home computer. For example, the user may transfer the application to a disk, e.g., CD-ROM, DVD, USB drive, etc., and then transfer the application to the home computer, or the user may establish a direct high-speed connection between the user's work computer and home computer, e.g., through an Ethernet connection. Furthermore, to allow the user to copy the application to more than one machine, authorization can occur when the user attempts to use the application.

Figure 8:
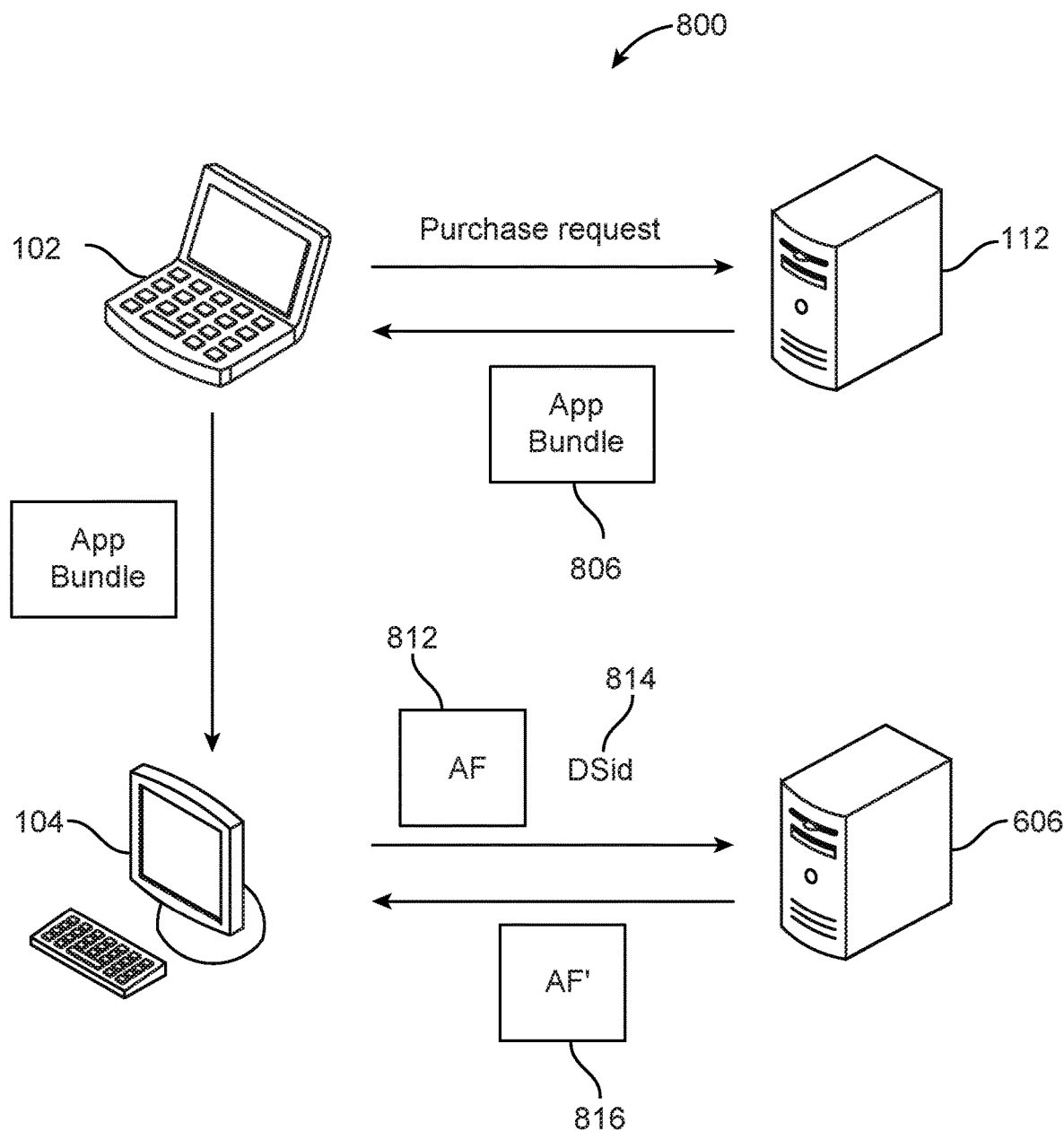
FIG. 8 illustrates an exemplary method for authorization on application launch.

FIG. 8 illustrates an exemplary scenario 800 for authorization on application launch. In this scenario, the user makes a purchase request from the user terminal 102. The purchase request is sent to the application distributor 112 where application bundle 806 is prepared using method 400 in FIG. 4. The application bundle 806 is sent to the user terminal 102. At some point, the application bundle 806 is copied to user terminal 104 where the user attempts to use the application. Upon launch of the application, the user terminal sends an authorization request to the server 606. In some configurations, the server 606 and the application distributor 112 can be the same. However, in other cases, the server 606 and the application distributor 112 can be different. As part of the authorization request, the server 606 receives the authorization file 812 and the user's account identifier 814. The server 606 performs the authorization method 600 in FIG. 6 and returns the updated authorization file 816 to the user terminal 104. Now that the user is authorized on the machine, the user can use the application. In some configurations, a user may already be authorized to use applications on the machine. In this case, no updates to the authorization file are required. Furthermore, in some cases, the user terminal determines that the user is authorized without making an authorization request to the server.

The user authorization scenario 600 in FIG. 6 only prevents a user from being authorized to run applications on more than a specified number of machines. By incorporating the application proof of purchase receipt created at the time of purchase, application verification can enforce an application usage policy that limits the use of a particular application to a specified number of machines or instances at any given time. For example, the application can be limited to five separate instances in five different guest virtual machines that all reside on a single host physical machine. When a user purchases an application, an application purchase receipt is included with the application. To use a purchased application on a particular machine, the account identifier in the proof of purchase receipt must be authorized on the machine. As described above, each machine can maintain a single authorization file that can specify the machine identifier for the machine and all account identifiers of users authorized to run applications on the machine. If the account identifier in the proof of purchase receipt is contained in the authorization file, the application can be used on the machine. However, if the user associated with the application is not authorized on the machine, the user can be authorized using an authorization method such as method 600 in FIG. 6. Both the proof of purchase receipt and the authorization file can be verified to prevent unauthorized modification of the proof of purchase receipt and/or authorization file and ensure that the receipt belongs to the application and the authorization file belongs to the machine.

Figure 9:
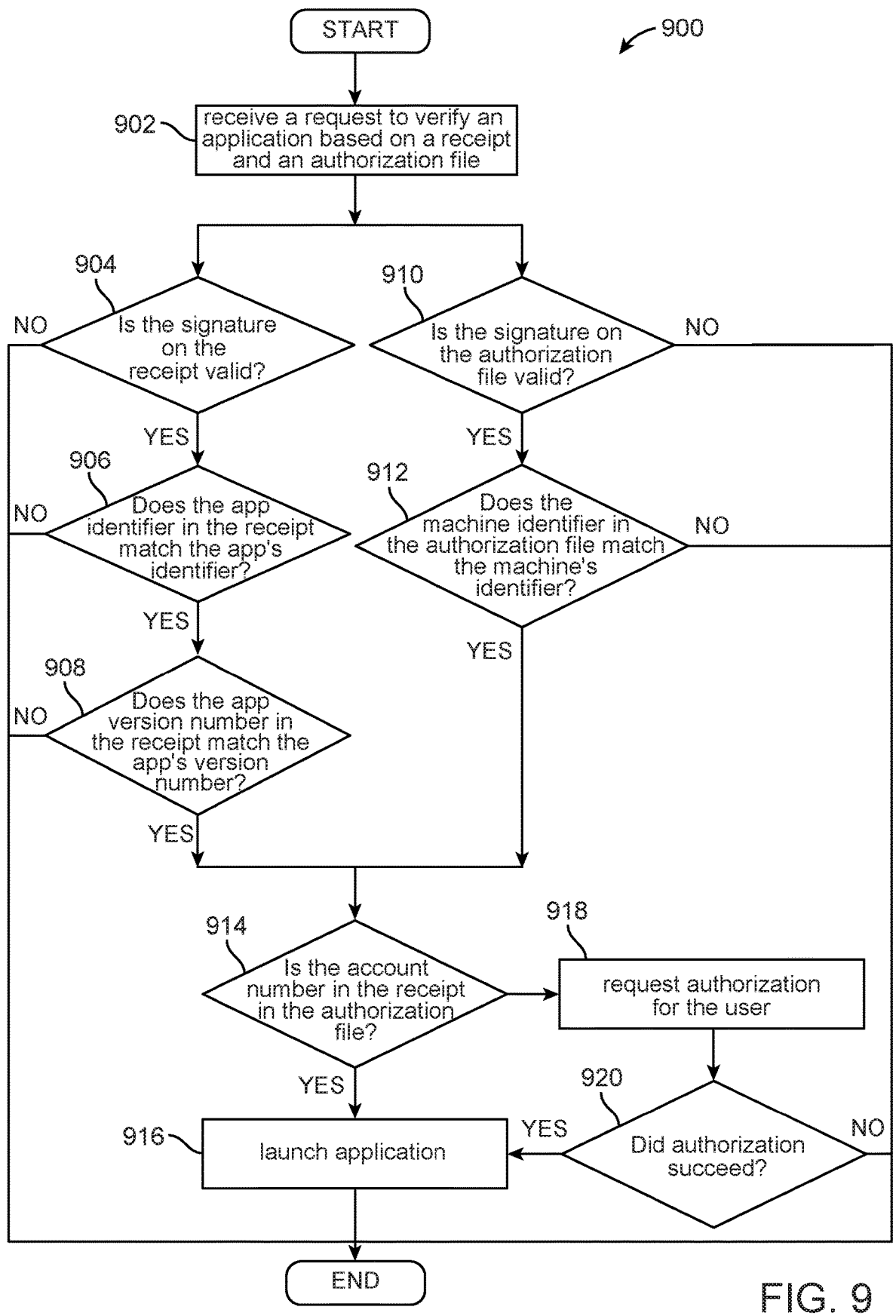
FIG. 9 illustrates an exemplary method embodiment for application verification.

The exemplary application verification method 900 in FIG. 9 can be used to enforce an application usage policy that is directed at limiting the purchasing user to a specified number of machines. The verification method 900 can use the application proof of purchase receipt 300 in FIG. 3 and the authorization file 500 in FIG. 5. For the sake of clarity, method 900 is discussed in terms of an exemplary system 100 as shown in FIG. 1. Although specific steps are shown in FIG. 9, in other embodiments, a method can have more or less steps than shown.

The application verification method 900 can be used each time a user launches an application and can be performed locally by the machine on which the application resides. However, the system can also be configured such that application verification is performed less frequently, such as on the first launch of the application. Additionally, application verification can be performed by making a verification request to a server or it can be a combination of local and remote actions.

Upon application launch, the user terminal 102 receives a request to verify an application based on a proof of purchase receipt 300 and an authorization file 500 (902). As part of the application verification, the user terminal 102 can verify the proof of purchase receipt 300, by first checking that the signature of the receipt is valid (904). If the signature is not valid, then it is likely that the receipt has been altered so the verification process is aborted and verification fails. If the signature is valid, the user terminal 102 checks if the application identifier in the receipt matches the identifier of the application being verified (906). If it does not match, verification fails. If the application identifier does match, the user terminal 102 checks if the application version number in the receipt matches the version number of the application being verified (908). If the version number does not match, the verification method fails, otherwise verification continues.

The verification method 900 can also include a verification of the authorization file 500. To verify the authorization file 500, the user terminal 102 checks if the signature on the file is valid (910). If the signature is not valid, then it is likely that the authorization file has been altered so the verification process is aborted and verification fails. If the signature is valid, the user terminal 102 checks if the machine identifier in the authorization file matches the identifier for the user terminal 102 (912). If it does not match, verification fails. If the machine identifier does match, the verification continues.

Depending on the configuration, steps 904, 906 and 908 can be performed before, after, or in parallel with steps 910 and 912. Furthermore, steps 904-912 do not have to be performed at all, but by performing the steps a level of assurance can be gained that the files are unaltered and correspond with the application and machine. After verifying the receipt 300 and authorization file 500. The user terminal 102 checks if the account number in the receipt, e.g., f(DSid), is in the authorization file (914). If so, the user who purchased the application is authorized on the machine, so the application can launch (916). If the user who purchased the application is not already authorized, the user terminal 102 can make an authorization request to the application distributor 112 (918). If the authorization request succeeds (920), the application can launch (916) otherwise verification fails.

In some configurations, the verification method 900 can occur inside of the application. In this case, the action taken upon a verification failure depends on the application developer. For example, upon verification failure, the application could quit. Alternatively, upon verification failure, the application could continue executing, but only limited functionality may be available. Additionally, depending on the configuration, the application may not be able to request authorization for the user.

Using the verification method 900 described above, the user associated with a purchased application can use the application on the number of machines specified in the usage policy. For example, if the maximum number of machines is five, the user can copy the application to five different machines and go through the authorization process on each machine. If the user wants to use the application on a 6th machine, the user has to de-authorize one of the already authorized machines. To do so, the user can send a "de-authorize" request from one of the authorized machines. Alternatively, in some configurations, the user can send a "de-authorize all" request from any machine, which will have the effect of de-authorizing all machines that the user was authorized on. After de-authorizing a machine, the user can go back to the 6th machine and authorize it. At this point, if the verification method 900 succeeds, the user can use the application.

In some cases, a user may attempt to circumvent the maximum machine usage policy. One way that a user may attempt to do this is as follows. Suppose the user associated with the purchased application is already authorized on the maximum number of machines, say five. To free up an authorization, the user de-authorizes a machine. However, prior to issuing the "de-authorize" request, the user makes a copy of the authorization file on the machine. After the de-authorization, the user copies the authorization file back into place. Now the machine thinks the user is authorized even though the user has been de-authorized.

Figure 10:
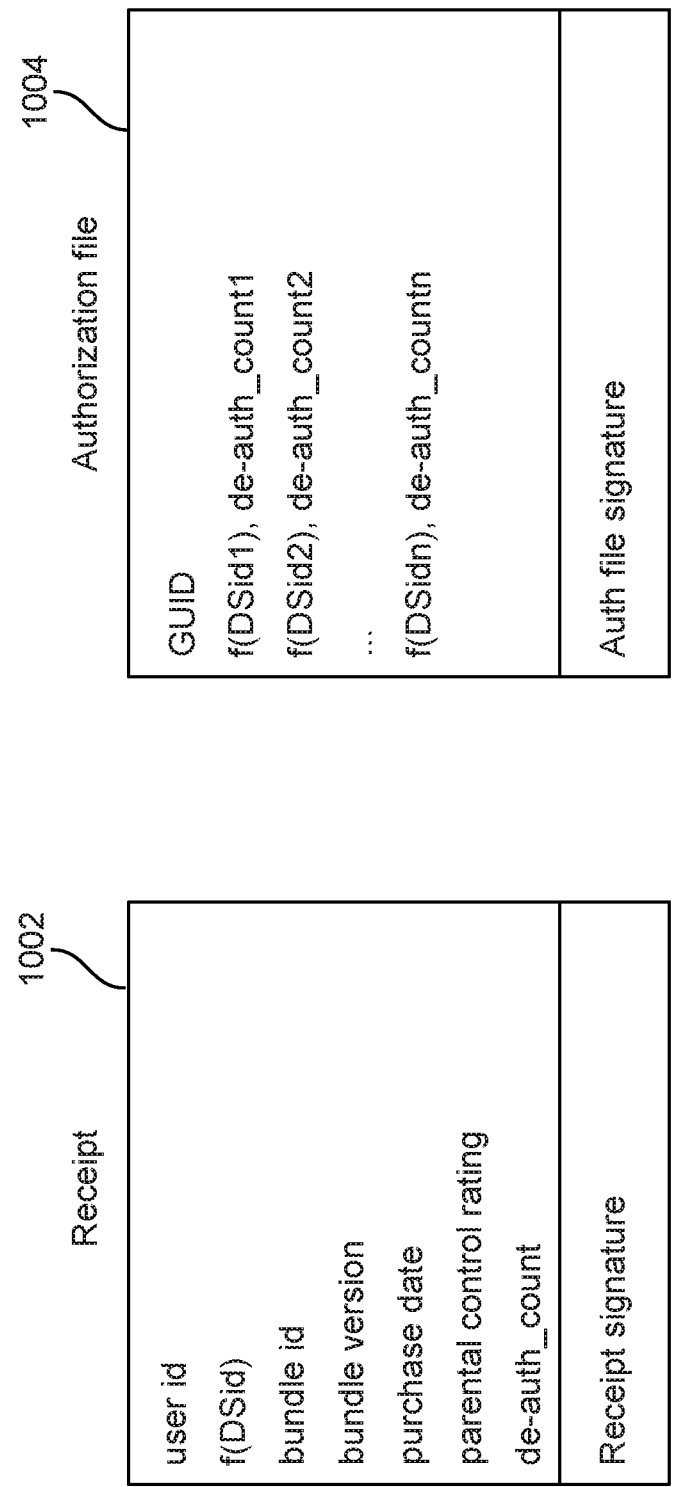
FIG. 10 illustrates exemplary application purchase receipt and authorization file with de-authorization counters.

To address this circumvention attack a de-authorization count field can be added to the application proof of purchase receipt and the authorization file. Additionally, a de-authorization count can also be maintained on the server. FIG. 10 illustrates an exemplary proof of purchase receipt 1002 and authorization file 1004 with de-authorization count fields. In the authorization file 1004, a separate de-authorization count can be associated with each authorized account identifier. Each time a user de-authorizes a machine, the de-authorization count on the server associated with the account identifier can be incremented. When a user purchases a new application, the de-authorization count in the authorization record associated with the user can be included in the application proof of purchase receipt. Additionally, when a user authorizes a machine, the de-authorization count associated with that account identifier can be included in the authorization file.

The de-authorization count can also be incorporated in the application verification method. When a user attempts to use an application, the verification method can perform all of the steps described in the verification method 900. However, the verification method can also check that the de-authorization count in the receipt is less than or equal to the de-authorization count in the authorization file. If this check fails, the user can be prevented from using the application on that machine.

Figure 11:
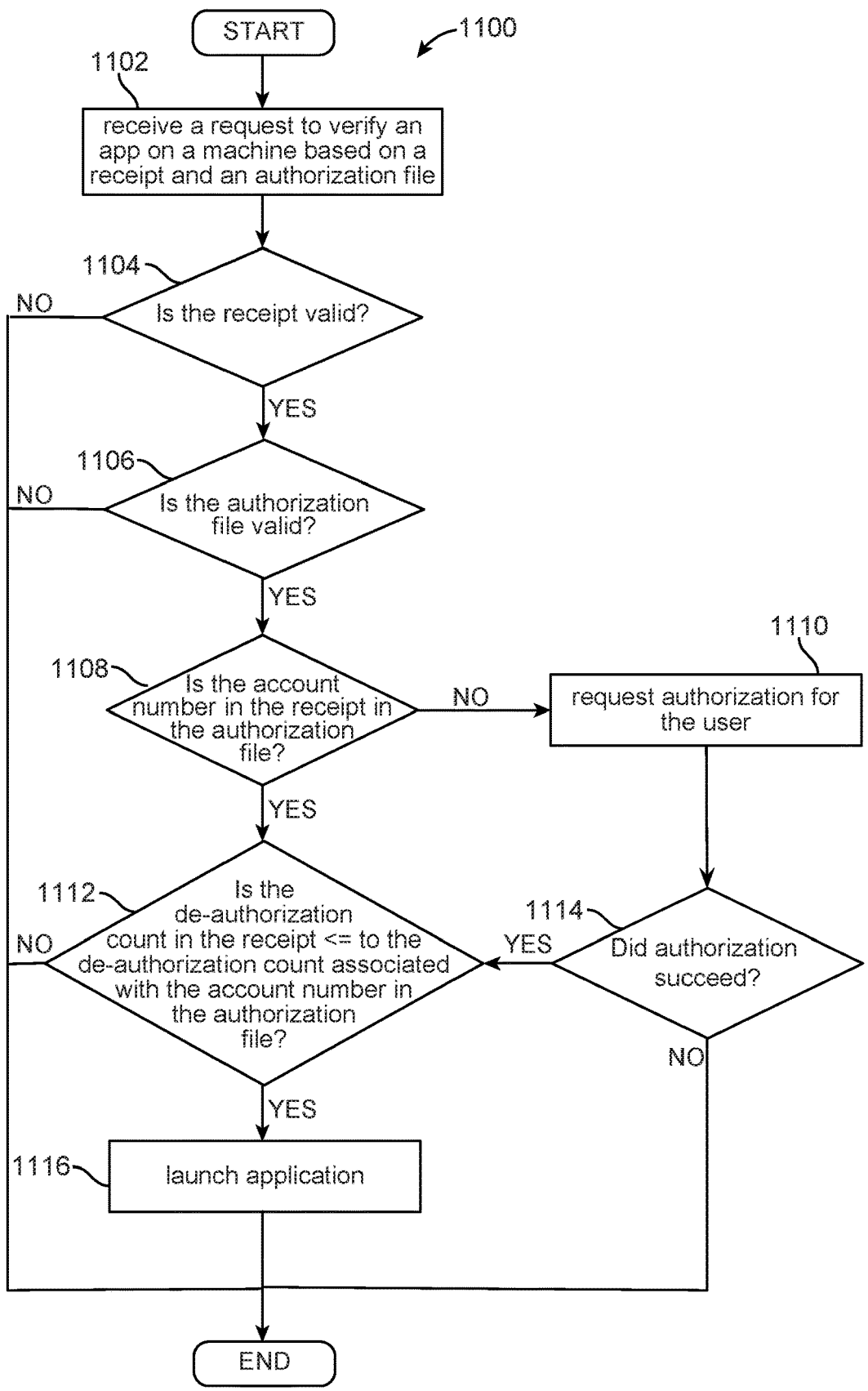
FIG. 11 illustrates an exemplary method embodiment for application verification using de-authorization counters.

FIG. 11 illustrates an exemplary application verification method 1100 that uses the de-authorization counters. The verification method 1100 can use the application proof of purchase receipt 1002 and the authorization file 1004 in FIG. 10. For the sake of clarity, method 1100 is discussed in terms of an exemplary system such as is shown in FIG. 1. Although specific steps are shown in FIG. 10, in other embodiments, a method can have more or less steps than shown.

The application verification method 1100 can be used each time a user launches an application and can be performed locally by the machine on which the application resides. However, the system can also be configured such that application verification is performed less frequently, such as on the first launch of the application. Additionally, application verification can be performed by making a verification request to a server or it can be a combination of local and remote actions.

Upon application launch, the user terminal 102 receives a request to verify an application based on a proof of purchase receipt 1002 and an authorization file 1004 (1102). The user terminal 102 can then verify that the proof of purchase receipt 1002 and authorization file 1004 are valid using steps similar to 904-912 in FIGS. 9 (1104 and 1106). If either validation step fails, the verification method aborts and the verification fails. Depending on the configuration, step 1104 can be performed before, after, or in parallel with step 1106. Furthermore, steps 1104 and 1106 do not have to be performed at all, but by performing the steps a level of assurance can be gained that the files are unaltered and correspond with the application and machine.

After verifying the receipt 1002 and authorization file 1004, the user terminal 102 checks if the account number in the receipt, e.g., f(DSid), is in the authorization file (1108). If so, the user who purchased the application is authorized on the machine and the verification can proceed to check the de-authorization counts. If the user who purchased the application is not already authorized, the user terminal 102 can make an authorization request to the application distributor 112 (1110). If the authorization request succeeds (1114), the user terminal 102 can proceed to check the de-authorization counts.

At step 1112, the user terminal 102 verifies the de-authorization counts by checking that the de-authorization count in the receipt is less than or equal to the de-authorization count in the authorization associated with account identifier. If so, verification has succeeded and the user terminal 102 can launch the application (1116). If the de-authorization count verification fails, it is likely a de-authorization attack has occurred so the user is prevented from using the application on the machine.

As with the verification method 900, verification method 1100 can be performed within the application. In this case, the action taken upon a verification failure depends on the application developer. For example, upon verification failure, the application could quit. Alternatively, upon verification failure, the application could continue executing, but only limited functionality may be available. Additionally, depending on the configuration, the application may not be able to request authorization for the user.

Figure 12:
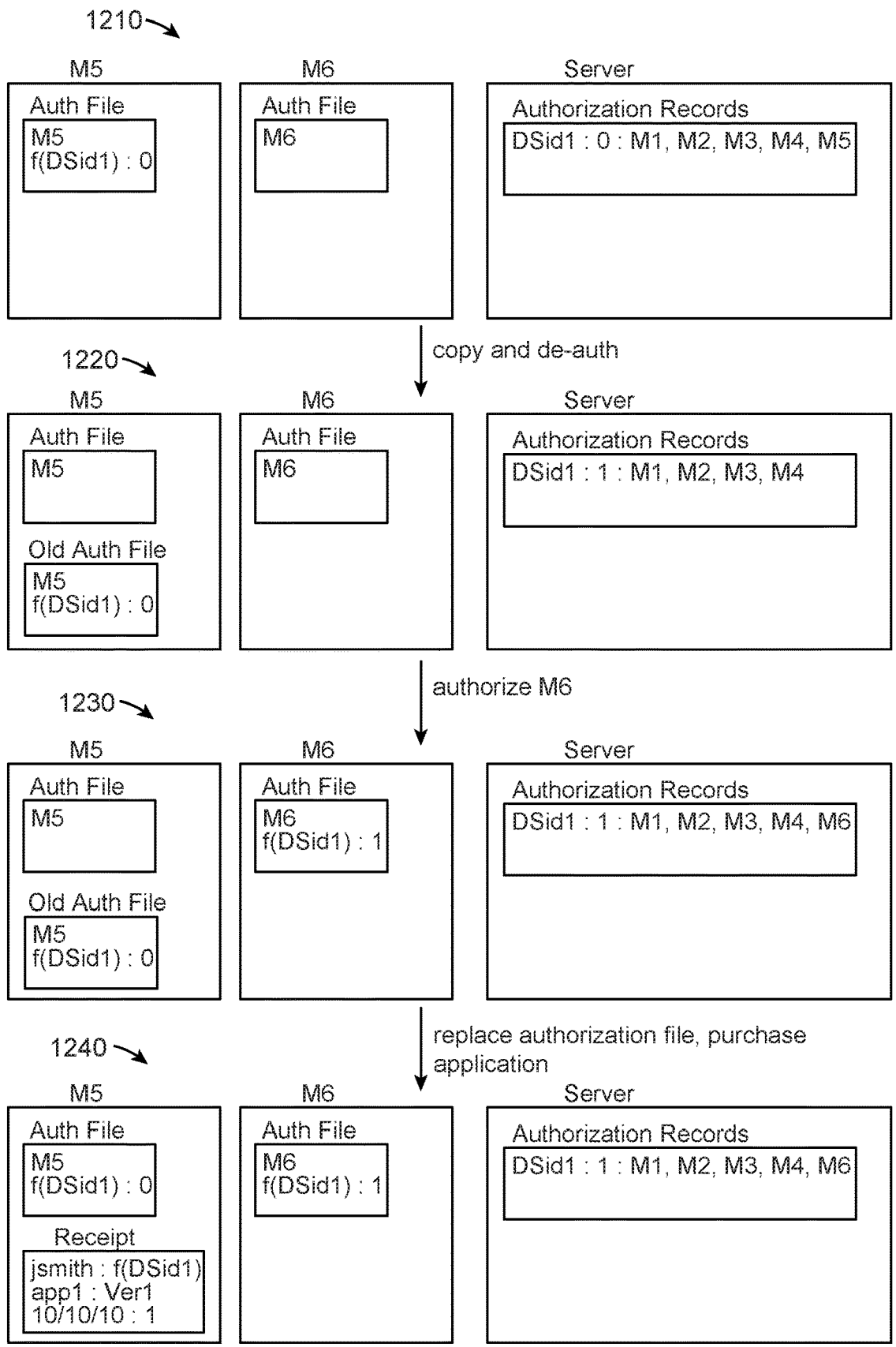
FIG. 12 illustrates an exemplary de-authorization counter usage scenario.

FIG. 12 illustrates an exemplary de-authorization counter usage scenario. In this scenario, the user with account identifier DSid1 is currently authorized on five machines: M1-M5. The user also wants to be able to use applications on a sixth machine M6, but the usage policy limits the number of authorizations to five. This initial scenario set up is reflected in the authorization files for machines M5 and M6 and in authorization records on the server (1210). Machine M5's authorization file contains and entry for DSid1 with an associated de-authorization count of zero. Machine M6's authorization file is empty. The authorization records on the server show that DSid1 is authorized on machines M1-M5 and the user has not de-authorized any machines.

In an attempt to use applications on a sixth machine M6, the user makes a copy of the authorization file on M5 and then de-authorizes the machine. These actions are reflected in the authorization file on machine M5 and the authorization records on the server (1220). Machine M5's authorization file is now empty. Additionally, the de-authorization count is increased to one and M5 has been removed from the list of authorized machines in the authorization records on the server.

The user now authorizes machine M6. This action results in two changes, which are reflected in machines M5 and M6 and the server (1230). First, the authorization file on machine M6 is updated to include DSid1 with a de-authorization count of 1. Second, the authorization records on the server are updated to include machine M6 in the list of authorized machines.

After the authorization, the user replaces the authorization file with the old authorization file and purchases an application. The changes are reflected in machines M5 and M6 and the server (1240). The de-authorization count in the proof of purchase receipt is 1. When the user attempts to use the application on machine M5, the machine can verify the application using verification method 1100. Since the de-authorization count in the proof of purchase receipt is greater than the de-authorization count in the authorization file, the verification method 1100 will fail at step 1112. The user can then be prevented from using the application on the machine.

Figure 13:
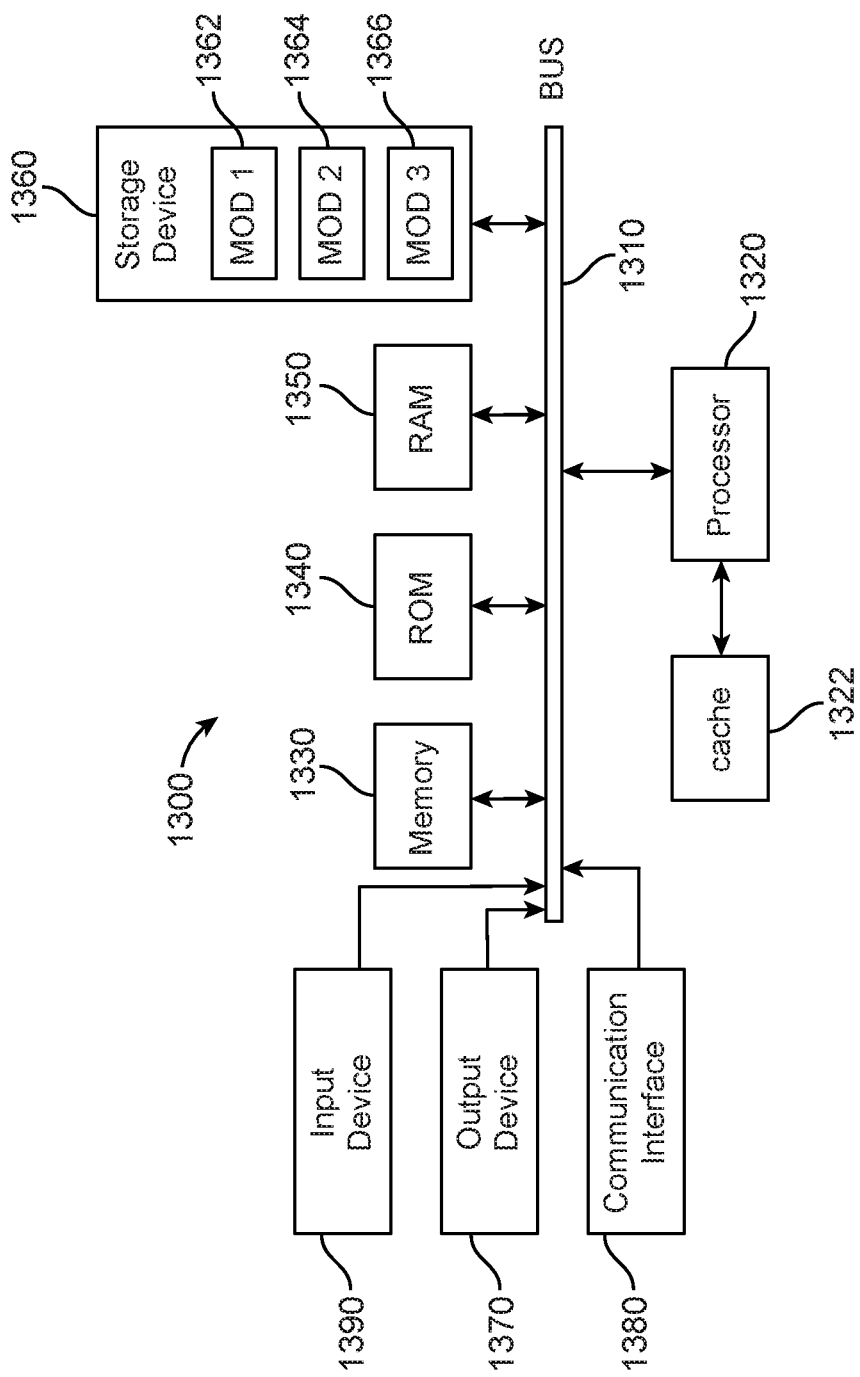
FIG. 13 illustrates an exemplary system embodiment.

The disclosure now turns to a discussion of a general-purpose computing device. All or part of the components shown in FIG. 13 and discussed below can be used to implement the various devices and infrastructure elements discussed above. With reference to FIG. 13, an exemplary system 1300 includes a general-purpose computing device 1300, including a processing unit (CPU or processor) 1320 and a system bus 1310 that couples various system components including the system memory 1330 such as read only memory (ROM) 1340 and random access memory (RAM) 1350 to the processor 1320. The system 1300 can include a cache 1322 of high speed memory connected directly with, in close proximity to, or integrated as part of the processor 1320. The system 1300 copies data from the memory 1330 and/or the storage device 1360 to the cache 1322 for quick access by the processor 1320. In this way, the cache 1322 provides a performance boost that avoids processor 1320 delays while waiting for data. These and other modules can be configured to control the processor 1320 to perform various actions. Other system memory 1330 may be available for use as well. The memory 1330 can include multiple different types of memory with different performance characteristics. It can be appreciated that the disclosure may operate on a computing device 1300 with more than one processor 1320 or on a group or cluster of computing devices networked together to provide greater processing capability. The processor 1320 can include any general purpose processor and a hardware module or software module, such as module 1 1362, module 2 1364, and module 3 1366 stored in storage device 1360, configured to control the processor 1320 as well as a special-purpose processor where software instructions are incorporated into the actual processor design. The processor 1320 may essentially be a completely self-contained computing system, containing multiple cores or processors, a bus, memory controller, cache, etc. A multi-core processor may be symmetric or asymmetric.

The system bus 1310 may be any of several types of bus structures including a memory bus or memory controller, a peripheral bus, and a local bus using any of a variety of bus architectures. A basic input/output (BIOS) stored in ROM 1340 or the like, may provide the basic routine that helps to transfer information between elements within the computing device 1300, such as during start-up. The computing device 1300 further includes storage devices 1360 such as a hard disk drive, a magnetic disk drive, an optical disk drive, tape drive or the like. The storage device 1360 can include software modules 1362, 1364, 1366 for controlling the processor 1320. Other hardware or software modules are contemplated. The storage device 1360 is connected to the system bus 1310 by a drive interface. The drives and the associated computer readable storage media provide non-volatile storage of computer readable instructions, data structures, program modules and other data for the computing device 1300. In one aspect, a hardware module that performs a particular function includes the software component stored in a non-transitory computer-readable medium in connection with the necessary hardware components, such as the processor 1320, bus 1310, output device 1370, and so forth, to carry out the function. The basic components are known to those of skill in the art and appropriate variations are contemplated depending on the type of device, such as whether the device 1300 is a small, handheld computing device, a desktop computer, or a computer server.

Although the exemplary embodiment described herein employs the hard disk 1360, it should be appreciated by those skilled in the art that other types of computer readable media which can store data that are accessible by a computer, such as magnetic cassettes, flash memory cards, digital versatile disks, cartridges, random access memories (RAMs) 1350, read only memory (ROM) 1340, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 1300, an input device 1390 represents any number of input mechanisms, such as a microphone for speech, a touch-sensitive screen for gesture or graphical input, keyboard, mouse, motion input, speech and so forth. An output device 1370 can also be one or more of a number of output mechanisms known to those of skill in the art. In some instances, multimodal systems enable a user to provide multiple types of input to communicate with the computing device 1300. The communications interface 1380 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1320. The functions these blocks represent may be provided through the use of either shared or dedicated hardware, including, but not limited to, hardware capable of executing software and hardware, such as a processor 1320, that is purpose-built to operate as an equivalent to software executing on a general purpose processor. For example the functions of one or more processors presented in FIG. 13 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1340 for storing software performing the operations discussed below, and random access memory (RAM) 1350 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1300 shown in FIG. 13 can practice all or part of the recited methods, can be a part of the recited systems, and/or can operate according to instructions in the recited non-transitory computer-readable storage media. Such logical operations can be implemented as modules configured to control the processor 1320 to perform particular functions according to the programming of the module. For example, FIG. 13 illustrates three modules Mod1 1362, Mod2 1364 and Mod3 1366 which are modules controlling the processor 1320 to perform particular steps or a series of steps. These modules may be stored on the storage device 1360 and loaded into RAM 1350 or memory 1330 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method for managing an application, the method comprising, at a client device associated with a user account:
sending a first request to a server device to acquire the application;
receiving from the server device, the application and a receipt including a de-authorization count that indicates a limit on a number of client devices associated with the user account that are authorized to execute the application; and
in conjunction with launching the application on the client device, and by the application:
sending, to the server device, a second request to authorize the client device to execute the application, wherein the second request includes an authorization file having the de-authorization count,
receiving, from the server device an updated authorization file that includes an updated de-authorization count associated with the user account that indicates that the client device is authorized to execute the application,
performing a verification step by comparing the de-authorization count in the receipt against the updated de-authorization count in the updated authorization file and,
in response to determining that the verification step is unsuccessful:
quitting execution of the application.

2. The method of claim 1, wherein:
the verification step is unsuccessful when the receipt or updated authorization file is invalid; and
the verification step is successful when the receipt and updated authorization file is valid.

3. The method of claim 2, wherein the receipt or updated authorization file is invalid when the de-authorization count included in the receipt is greater than the updated de-authorization count included in the updated authorization file.

4. The method of claim 3, wherein the receipt and updated authorization file is valid when the de-authorization count is less than or equal to the updated de-authorization count.

5. The method of claim 1, wherein the updated authorization file includes a digital signature that is formed based on a private key of the server device.

6. The method of claim 1, wherein the first request includes a unique account identifier associated with the client device, and the updated authorization file includes the unique account identifier.

7. A client device configured to manage an application, the client device comprising: at least one processor; and at least one memory storing instructions that, in response to being executed by the at least one processor, cause the client device that is associated with a user account to carry out steps that include:
sending a first request to a server device to acquire the application;
receiving from the server device, the application and a receipt including a de-authorization count that indicates a limit on a number of client devices associated with the user account that are authorized to execute the application; and
in conjunction with launching the application on the client device, and by the application:
sending, to the server device, a second request to authorize the client device to execute the application, wherein the second request includes an authorization file having the de-authorization count,
receiving, from the server device an updated authorization file that includes an updated de-authorization count associated with the user account that indicates that the client device is authorized to execute the application,
performing a verification step by comparing the de-authorization count in the receipt against the updated de-authorization count in the updated authorization file and,
in response to determining that the verification step is unsuccessful:
quitting execution of the application.

8. The client device of claim 7, wherein:
the verification step is unsuccessful when the receipt or updated authorization file is invalid; and
the verification step is successful when the receipt and updated authorization file is valid.

9. The client device of claim 8, wherein the receipt or updated authorization file is invalid when the de-authorization count included in the receipt is greater than the updated de-authorization count included in the updated authorization file.

10. The client device of claim 9, wherein the receipt and updated authorization file is valid when the de-authorization count is less than or equal to the updated de-authorization count.

11. The client device of claim 7, wherein the updated authorization file includes a digital signature that is formed based on a private key of the server device.

12. The client device of claim 7, wherein the first request includes a unique account identifier associated with the client device, and the updated authorization file includes the unique account identifier.

13. At least one non-transitory computer readable storage medium storing instructions that, when executed by at least one processor included in a client device, cause the client device that is associated with a user account to carry out steps that include:
sending a first request to a server device to acquire the application;
receiving from the server device, the application and a receipt including a de-authorization count that indicates a limit on a number of client devices associated with the user account that are authorized to execute the application; and
in conjunction with launching the application on the client device, and by the application:
sending, to the server device, a second request to authorize the client device to execute the application, wherein the second request includes an authorization file having the de-authorization count,
receiving, from the server device an updated authorization file that includes an updated de-authorization count associated with the user account that indicates that the client device is authorized to execute the application,
performing a verification step by comparing the de-authorization count in the receipt against the updated de-authorization count in the updated authorization file and,
in response to determining that the verification step is unsuccessful:
quitting execution of the application.

14. The at least one non-transitory computer readable storage medium of claim 13, wherein:

the verification step is unsuccessful when the receipt or updated authorization file is invalid; and the verification step is successful when the receipt and updated authorization file is valid.

15. The at least one non-transitory computer readable storage medium of claim 14, wherein the receipt or updated authorization file is invalid when the de-authorization count included in the receipt is greater than the updated de-authorization count included in the updated authorization file.

16. The at least one non-transitory computer readable storage medium of claim 15, wherein the receipt and updated authorization file is valid when the de-authorization count is less than or equal to the updated de-authorization count.

17. The at least one non-transitory computer readable storage medium of claim 13, wherein the updated authorization file includes a digital signature that is formed based on a private key of the server device.

18. The at least one non-transitory computer readable storage medium of claim 13, wherein the first request includes a unique account identifier associated with the client device, and the updated authorization file includes the unique account identifier.

* * * * *

UNITED STATES PATENT AND TRADEMARK OFFICE
CERTIFICATE OF CORRECTION

| | |
|---|---|
| PATENT NO. | : 11,475,106 B2 |
| APPLICATION NO. | : 16/177250 |
| DATED | : October 18, 2022 |
| INVENTOR(S) | : Jean-Pierre Ciudad et al. |

It is certified that error appears in the above-identified patent and that said Letters Patent is hereby corrected as shown below:

In the Specification

Column 10, Line 62: "similar to 904-912 in FIGS. 9 (1104 and 1106). If either" should read -- similar to 904-912 in FIG. 9 (1104 and 1106). If either --.

Signed and Sealed this
Third Day of October, 2023

Katherine Kelly Vidal
*Director of the United States Patent and Trademark Office*